United States Patent
Jiang

(10) Patent No.: US 7,284,179 B2
(45) Date of Patent: Oct. 16, 2007

(54) WINDOW BASED STALL AVOIDANCE MECHANISM FOR HIGH SPEED WIRELESS COMMUNICATION SYSTEM

(75) Inventor: Sam Shiaw-Shiang Jiang, Hsinchu (TW)

(73) Assignee: Innovative Sonic Limited, Tortola (VG)

( * ) Notice: Subject to any disclaimer, the term of this patent is extended or adjusted under 35 U.S.C. 154(b) by 850 days.

(21) Appl. No.: 10/330,879

(22) Filed: Dec. 27, 2002

(65) Prior Publication Data

US 2003/0125056 A1  Jul. 3, 2003

Related U.S. Application Data

(60) Provisional application No. 60/345,682, filed on Jan. 3, 2002.

(51) Int. Cl.
  *H04L 1/16* (2006.01)
(52) U.S. Cl. .................................................. 714/748
(58) Field of Classification Search ................ 714/751, 714/748; 370/229; 709/232; 710/29
  See application file for complete search history.

(56) References Cited

U.S. PATENT DOCUMENTS

| | | | | |
|---|---|---|---|---|
| 5,550,808 | A * | 8/1996 | Shimokoshi ................ | 370/230 |
| 6,415,410 | B1 * | 7/2002 | Kanerva et al. ............. | 714/749 |
| 6,574,668 | B1 * | 6/2003 | Gubbi et al. ................ | 709/237 |
| 6,646,987 | B1 * | 11/2003 | Qaddoura ................... | 370/231 |
| 6,687,227 | B1 * | 2/2004 | Li et al. ..................... | 370/231 |
| 6,754,228 | B1 * | 6/2004 | Ludwig ...................... | 370/468 |
| 6,757,245 | B1 * | 6/2004 | Kuusinen et al. ........... | 370/230 |
| 6,798,842 | B2 * | 9/2004 | Jiang ......................... | 375/295 |
| 6,831,912 | B1 * | 12/2004 | Sherman ..................... | 370/349 |
| 6,865,163 | B1 * | 3/2005 | Bergenwall et al. ........ | 370/288 |
| 6,901,063 | B2 * | 5/2005 | Vayanos et al. ............ | 370/335 |
| 6,904,286 | B1 * | 6/2005 | Dantu ...................... | 455/452.2 |
| 6,907,005 | B1 * | 6/2005 | Dahlman et al. ........... | 370/236 |
| 6,925,502 | B1 * | 8/2005 | Abbasi et al. .............. | 370/231 |
| 6,928,052 | B2 * | 8/2005 | Packer ....................... | 370/231 |
| 6,965,943 | B1 * | 11/2005 | Golestani .................... | 709/235 |
| 6,983,409 | B1 * | 1/2006 | Vollmer et al. ............. | 714/748 |
| 6,990,069 | B1 * | 1/2006 | Ramakrishnan ............ | 370/229 |
| 6,990,531 | B2 * | 1/2006 | Vange ........................ | 370/231 |
| 7,000,021 | B1 * | 2/2006 | Radhakrishnan et al. ... | 709/230 |
| 7,020,083 | B2 * | 3/2006 | Garcia-Luna-Aceves et al. ............. | 370/230 |
| 7,035,214 | B1 * | 4/2006 | Seddigh et al. ............. | 370/231 |
| 7,096,247 | B2 * | 8/2006 | Jayam et al. ............... | 709/200 |
| 7,099,273 | B2 * | 8/2006 | Ha et al. .................... | 370/229 |
| 7,126,917 | B2 * | 10/2006 | Harris et al. ................ | 370/235 |
| 7,187,677 | B2 * | 3/2007 | Torsner et al. .............. | 370/394 |

OTHER PUBLICATIONS

The Document of 3GPP TSG-RAN WG2 Meeting #26, R2-020082, Offered by ASUS.
"Computer networks" Prentice-Hall International, Jun. 5, 1992, pp. 236-237.
The document of 3GPP TSG-RAN WG2 Meeting #25, R2-012537, offered by Erricson.

\* cited by examiner

*Primary Examiner*—Stephen M. Baker
(74) *Attorney, Agent, or Firm*—Birch, Stewart, Kolasch & Birch, LLP.

(57) ABSTRACT

Instead of using a fixed size window, the invention will calculate the window size based on the receiver's capacities and configured system parameters. Moreover, this invention modifies operations regarding how to shift the transmission window at the transmitter and the receiving window at the receiver and how to deliver the received data blocks in-sequence by the receiver, so that it fixes problems of the prior art.

21 Claims, 2 Drawing Sheets

WINDOW BASED STALL AVOIDANCE MECHANISM FOR HIGH SPEED WIRELESS COMMUNICATION SYSTEM

CROSS REFERENCE APPLICATION

This application claims priority from U.S. Provisional Patent Application No. 60/345,682 filed on Jan. 3, 2002.

BACKGROUND

This invention relates to a window based stall avoidance mechanism in a HARQ of a wireless communication system. More particularly, this invention provides a dynamically calculated window size and a set of well-defined rules to improve system performance and resolve problems of the prior art.

The High Speed Downlink Packet Access (HSDPA) uses HARQ (Hybrid ARQ) and other techniques to handle high throughput. Meanwhile, by using Transmission Sequence Number (TSN) to track data blocks and by temporarily storing received data blocks based on their TSN and their priority classes in different reordering buffers, the receiver has the capacity for an in-sequence delivery of its receiving data blocks to high layer. However, stall situations happen when data blocks with higher TSN are kept in a particular reordering buffer and can not be delivered to upper layer because one or more data blocks of lower TSN in the same reordering buffer are missing. Several reasons may cause missing data blocks in a reordering buffer. First, some data blocks require more re-transmissions than others do before the receiver correctly decodes them. Second, transmission of a data block may be interrupted by the request to transmit data blocks with higher priority class. The interrupted data block may be re-initiated later when there is no more requests to transmit higher priority data blocks. Third, the transmitter may erroneously receive an ACK instead of a NACK returned by the receiver for a sent data block. Then the transmitter discards the particular data block from its retransmission buffer (i.e. the Note B) that causes the TSN of the data block become a "permanent" missing gap at the receiver. Last, after a predefined maximum number of retransmission of a data block, the transmitter may discard the data block from the retransmission buffer that will cause a "permanent" missing gap at the receiver.

Furthermore, because the number of bits allocated to represent a TSN is finite. For example, in a 6-bit TSN system, the TSN has the value between 0-63. In a high speed downlink HARQ setup, the transmitter may transfer hundreds of data blocks with the same priority class to the same receiver in a very short period of time. Therefore, the TSN value 0-63 will be used repeatedly. The wrap around of finite bit representation of TSNs can cause ambiguity. Without a proper mechanism, the receiver has difficulty to distinguish whether received data blocks belonging to the same cycle or different cycles.

Overall, to combat the stall and wrap around problems, there are two major stall avoidance mechanisms. One is a window based mechanism and another is a timer based one to prevent the stall problem. Of course, several complementary stall avoidance mechanisms exist. Namely, a mechanism uses "In-band acknowledge sequence number (ASN)" and a mechanism uses an in-band MRW bit to indicate the transmission window lower edge.

In brief, referring to FIG. 1—the logical flowchart of the window based prior art stall avoidance mechanism, the prior art mechanism sets up a window of TSNs, where the range of the window is smaller than the whole possible range of TSNs. Usually as indicated in Step 5 the system sets the window size "WINDOW" equal to be half of the transmitter sequence number space as specified. In the case of 6-bit TSN with values between 0-63, the system sets WINDOW=32. In an ideal condition, at any given time the transmitter transmits data blocks having TSN within its window range while the receiver will receive data blocks having TSN within its window range. After the transmitter has transmitted a data block with TSN=SN, the transmitter will not retransmit any data block with TSN$\leq$SN−WINDOW to avoid sequence number ambiguity in the receiver as indicated in Steps 10, 15, 20 and 25. Theoretically, transmitting and receiving data blocks within the smaller window in both the transmitter and the receiver shall reduce the ambiguity caused by TSN wrap around.

Meantime, at the receiver, the receiver initializes its window upper edge equal to WINDOW−1 and its widow lower edge equal to 0 having WINDOW as the total window size (Step 30). When a data block with TSN=SN is received in Steps 35 and 40, if the SN of the data block is within the receiving window (Step 40) and this data block has not previously been received (Step 45), the data block is placed in the reordering buffer at the place indicated by its TSN (Step 55). But if this data block has been previously received it shall be discarded (Step 50). Then as indicated in Step 60, if the SN is outside the receiving window, the received data block shall be placed above the highest received TSN in the reordering buffer, at the position indicated by SN. The receiving window shall be advanced so that the SN forms the upper edge of the receiving window and any data blocks with TSN$\leq$SN−WINDOW shall be removed from the reordering buffer as Step 60 specified. After Step 55 or Step 60, all received data blocks with consecutive TSNs up to the first not received data block are delivered to higher layer (Step 65).

The window based prior art mechanism presents several potential problems. First, a 6-bit TSN prior art system has a fixed window size of 32. The actual window size should be flexibly configured according to UE capabilities. In addition, the latency of received data block will be degraded when uses a larger window size. For example, if negative acknowledgment (NACK) of data block TSN=0 by the Receiver is mistakenly recognized as positive acknowledgment (ACK) by the Transmitter, the receiver need to receive data blocks TSN=1 to 32 successfully before data block TSN=0 can be discarded and other data blocks can be delivered to upper layer if the system uses the fixed window size of WINDOW=32. Second, the criterion of "TSN$\leq$TSN−WINDOW" used at the transmitter (Steps 15, 20 and 25) is ambiguous and how to update the transmission window at the transmitter is not well defined. For example, in a 6-bit TSN system having WINDOW=32, if TSN=SN=63 is transmitted. According to the prior art, TSN$\leq$SN−WINDOW=31 (i.e. TSN=0 to 31) should not be retransmitted. However, whether new data blocks of TSN=0 to 31 can be transmitted is not specified.

Furthermore, in the prior art, the receiving window is advanced only by receiving a data block with the SN outside the receiving window (unconditionally). This rule has the advantage that the transmitter can advance its transmission window without requiring explicit signaling from the transmitter to the receiver. However, this rule will cause potential TSN ambiguity problems. In the following example, Example A, using a 3-bits TSN system with the WINDOW=4 to illustrate, the receiver misses data blocks TSN=0 and 1 and receives data blocks TSN=2 and 3. Then, data blocks with TSN=4 and 5 are received. The upper edge is updated to TSN=5 and the lower edge is updated to TSN=2. Data blocks with TSN=2, 3, 4 and 5 are delivered to upper layers while the receiving window range is between TSN=2 to TSN=5 at this moment. If the receiver receives data block TSN=2 (of the next cycle) and misses data blocks TSN=6, 7, 0, 1. This is possible if NACK for data block TSN=6 is mistaken as ACK by the transmitter so that data block TSN=2 is within the transmission window (TSN=7, 0, 1, and 2 are the transmission window at this moment). According to the prior art, the receiver will take the data block TSN=2 of the next cycle as before data block TSN=5 of the current cycle, recognize the data block of TSN=2 as having been received, and discard it. The system performance is degraded by discarding such a data block prematurely. In fact, the Receiver should update its window's upper edge to TSN=2 in this example (Example A). The prior art has no way to find this correct behavior. In addition, in case of TSN corrupted but undetected by CRC, the prior art is not robust. One more example is used to illustrate the prior art problem, in Example B, using a 6-bit TSN system, data block TSN=0 is missing, data blocks TSN=1, 2 and 3 are received. Data block TSN=4 is corrupted and decoded as TSN=44. Then the missing data block TSN=0 is received after the corrupted data block with TSN=44. By the rules of the prior art, when TSN=44 is received, the receiver will advance the receiving window's upper edge to TSN=44 and the lower edge to TSN=13. Data blocks TSN=1, 2 and 3 are delivered to higher layer. When data block TSN=0 is received, since it is outside the receiving window, the receiver will advance the upper edge of the receiving window to TSN=0. Thus, finally, data block TSN=0 will be delivered to higher layer after the delivered data blocks TSN=1, 2 and 3. An out-of-sequence delivery error occurs.

SUMMARY

By using an optimal window size and a set of well defined rules of how both the transmission window and the receiving window should act within a HARQ processes, this invention improves the system performance on transmission latency. In addition, the invention provides solutions for these potential problems presented in the prior art.

BRIEF DESCRIPTION OF THE DRAWINGS

Following drawings with reference numbers and exemplary embodiments are referenced for explanation purpose.

DESCRIPTION OF THE INVENTION

Instead of rigidly define the transmission and the receiving window size equal to half of the TSN space, the transmitter's upper layers of this invention dynamically calculates the window size based on the capabilities of the UE, such as the supported number of reordering queues and the memory size reserved for each reordering queue. In addition, the window size shall be based on the values of the parameter M, the maximum number of multiple transmissions of a data block, and the parameter N, the number of active HARQ processes configured for the UE. Specifically, as an example, the formula is $(N-1)*M+1$. The transmitter will set WINDOW equal to the smaller value of $((N-1)*M+1)$ and W, where W is the maximum window size supported by the receiver. The transmission window size at the Note B and the receiving window size at the UE shall have the same value. All arithmetic operations of TSNs are performed together with modulo (TSN space). And arithmetic comparison is performed using the lower edge of the window as the comparison base.

Therefore, the window size WINDOW of a 6-bit TSM system can be less than 32 as long as the value of WINDOW is synchronized between the transmitter and the receiver to increase the system performance. Overall, the window size should be less than or equal to half of the TSN spaces and greater than or equal to the number of HARQ processes configured for the receiver UE.

Figure 1:
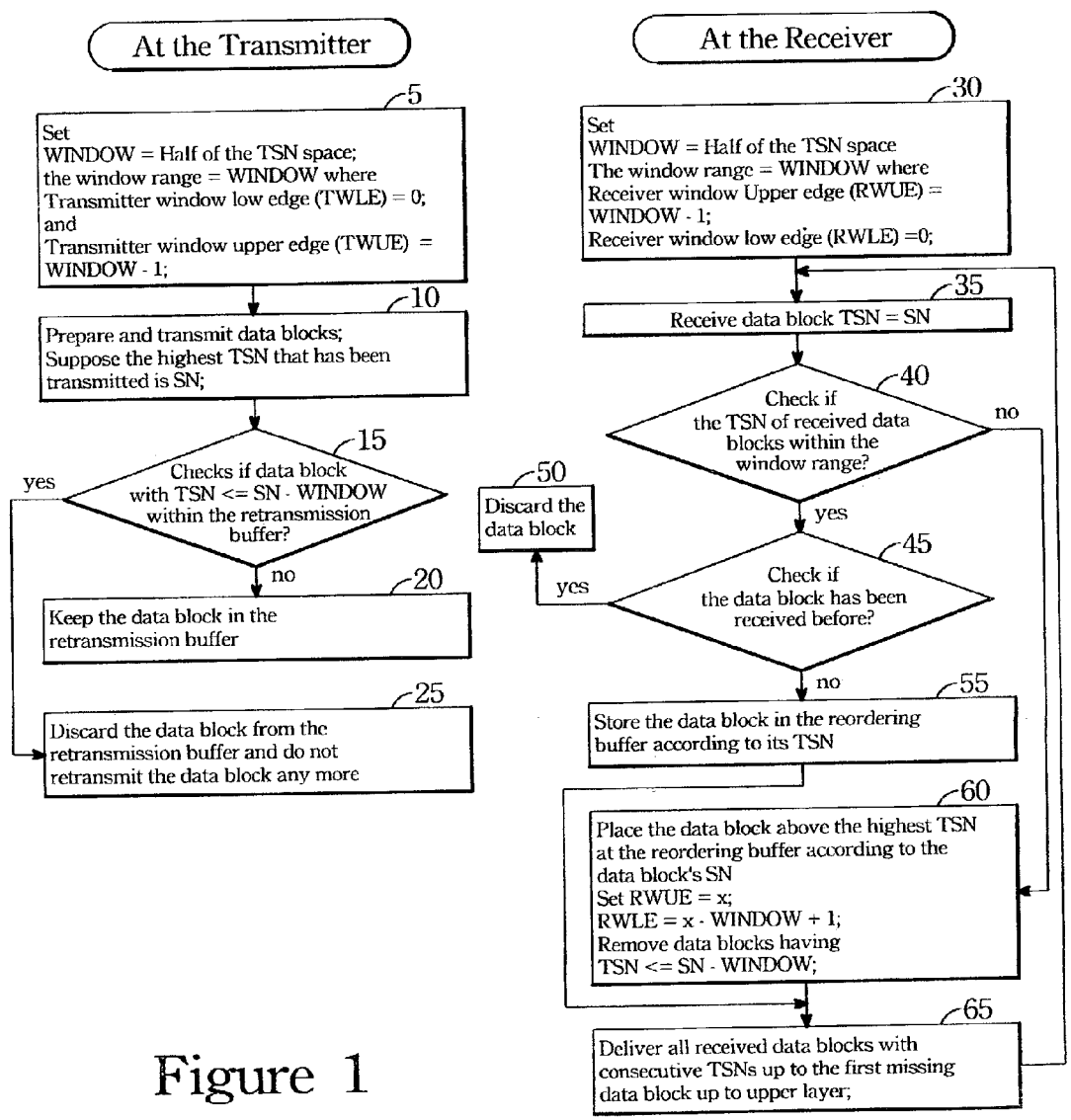
FIG. 1 illustrates the logical flowchart of a window based stall avoidance mechanism of the prior art.
Figure 2:
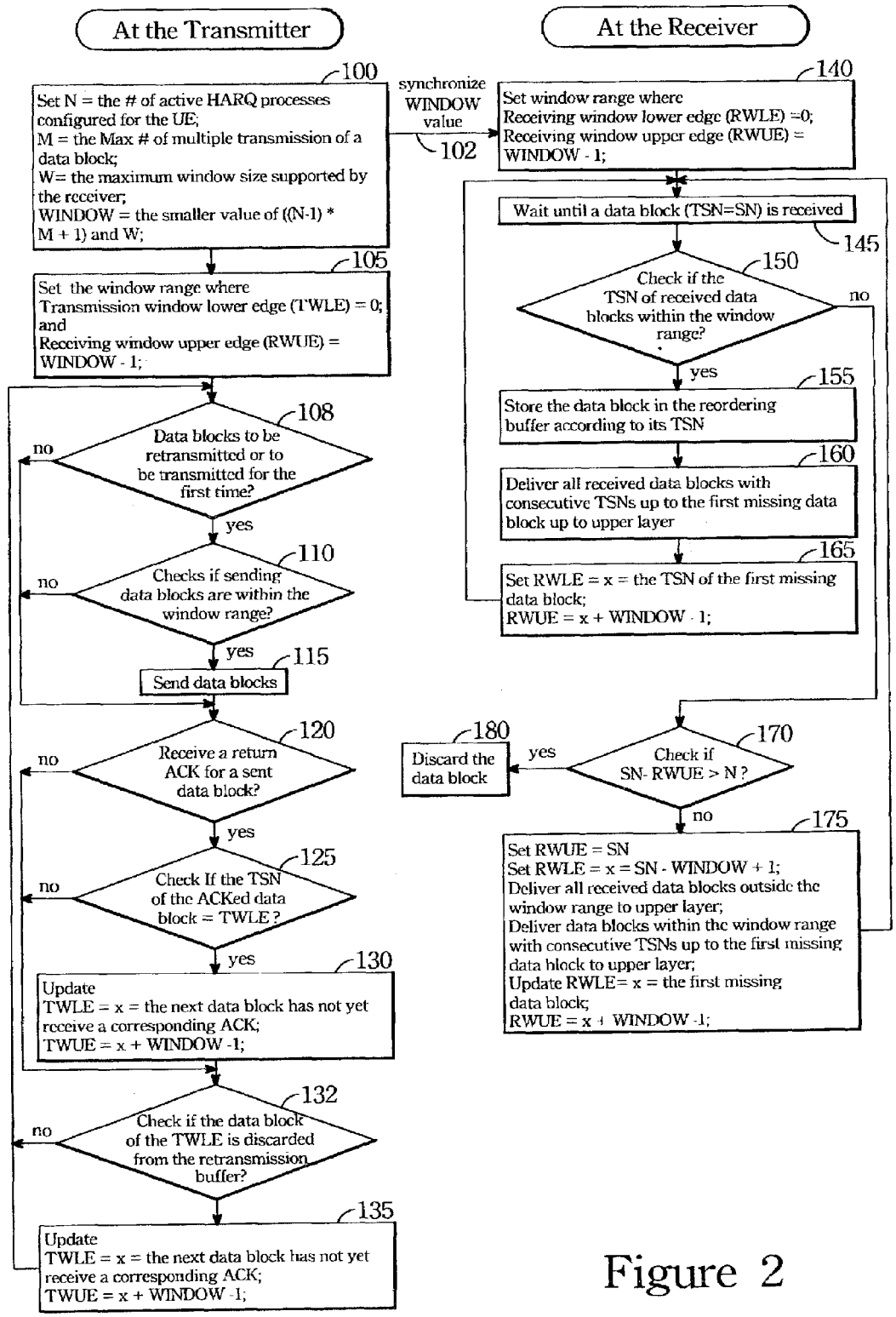
FIG. 2 illustrates a logical flowchart of an example to implement the window based stall avoidance mechanism of this invention.

FIG. 2 is a logical flowchart to illustrate an example of how the invention can be implemented. At the transmitter side, in Steps 100 and 105 the value of WINDOW is determined and the initial transmission window range is set from 0 to WINDOW−1, i.e., the transmission window lower edge is set to be 0 and the upper edge is set to be WINDOW−1. Meantime, the value of WINDOW will be synchronized between the transmitter and the receiver (Step 102). The transmitter sends data blocks with their TSN within its window range in Steps 108, 110 and 115. If the transmitter receives a return ACK from the receiver for a sent data block that has its TSN equal to the current lower edge of the transmission window (Steps 120 and 125), the lower edge is updated to TSN of the next data block (with TSN=x) not yet positively acknowledged; and the upper edge is updated to (x+WINDOW−1), where x is the updated lower edge as specified in Step 130.

Next, if the data block with TSN equal to the lower edge is already discarded from the retransmission buffer (Step 132), the lower edge is updated to TSN of the next data block (with TSN=x) not yet positively acknowledged; and the upper edge is updated to (x+WINDOW−1), where x is the updated lower edge (Step 135). Of course, any data block outside the transmission window shall not be transmitted nor retransmitted.

Meanwhile, at the receiver side, based on the WINDOW value sent over by the transmitter, the receiver initializes its window range from 0 to WINDOW−1, i.e., the receiving window lower edge=0 and the receiving window upper edge=(WINDOW−1) in Step 140. When a data block with TSN=SN is received (Step 145), if SN is within the receiving window as Step 150 indicates, the data block is placed in the reordering buffer at the place indicated by the TSN (Step 155). Then, all received data blocks with consecutive TSNs up to the first missing data block are delivered to higher layer (Step 160). Next, in the Step 165, the lower edge of the receiving window is updated to TSN of the first missing data block (with TSN=x). The upper edge of the receiving window is updated to (x+WINDOW−1), where x is the updated lower edge.

However, if the TSN of the received data block is outside the receiving window, check if ((SN−the upper edge of the receiving window)>N) is true (Step 170), where N is the number of active HARQ processes configured for the UE. If it is true, the data block shall be discarded (Step 180). On the other hand, if ((SN−the upper edge of the receiving window) ≦N) is true, as indicated in Step 175, the received data block shall be placed above the highest received data block TSN in the reordering buffer, at the position indicated by the data block's TSN. And then the receiving window shall be advanced so that SN becomes the upper edge of the receiving window and the lower edge of the receiving window is updated to (SN−WINDOW+1). Any received data blocks outside the updated receiving window shall be delivered to upper layers; all received data blocks inside the updated receiving window with consecutive TSNs up to the first missing data block are delivered to higher layer. Afterward, the lower edge of the receiving window is further updated to the TSN of the first missing data block (with TSN=x); the upper edge of the receiving window is further updated to (x+WINDOW−1), where x is the updated lower edge.

Finally, apply the rule of this invention to the Example A discussed before. When data blocks with TSN=4 and 5 are received, the receiving window is updated to be the range between 2 to 5. Data blocks with TSN=2, 3, 4 and 5 are delivered to upper layers. The receiving window is further updated to be the range between 6 and 1 (of the next cycle). When the next data block TSN=2 is received, the upper edge of receiving window is updated to 2 and the lower edge is updated accordingly to 7. Data block TSN=5 is then delivered to upper layers. Since data block with TSN=7 (the lower edge of the receiving window) is not received, the receiving window is not further updated. Hence, the TSN=2 of the next cycle is not discarded prematurely as the prior art.

Likewise, In the Example B, suppose the number of active HARQ process for the UE is 6, i.e. N=6 and the upper edge of the window is 31. When TSN=SN=44 is received, because SN−upper edge=44−31=13 >N, the data block of TSN=44 is recognized as corrupted and is discarded. The system robustness is improved.

What is claimed is:

1. A window based method to avoid the stall of data blocks during in-sequence delivery using reordering buffers at the receiver in a High Speed Downlink Packet Access (HSDPA) of a wireless communication system, wherein the transmitter assigns a Transmission Sequence Number (TSN) to each data block, the method comprising the steps of:
at the transmitter:
    calculating the transmission window size (WINDOW) based on the receiver's capacity and a plurality of configured system parameters;
    synchronizing the value of WINDOW with the receiver;
    initializing the transmission window with the transmission window lower edge (TWLE) set to a first constant, c1, and the transmission window upper edge (TWUE)=(c1+WINDOW−1);
    sending a data block only if its TSN is within the range of die transmission window;
    receiving an acknowledgement for a sent data block from the receiver;
    updating the boundaries of the transmission window if the TSN of the acknowledged data block is equal to the current transmission window lower edge; and
    updating the boundaries of the transmission window if a data block is discarded from the retransmission buffer.

2. The method as claimed in claim 1;
    wherein the first constant, c1=0.

3. The method as claimed in claim 1;
    wherein calculating the transmission window size (WINDOW) based on the receiver's capacity and a plurality of configured system parameters further comprises the steps of:
    setting M=the maximum number of multiple transmissions of a data block;
    setting N=the number of active HARQ processes configured for the receiver; and
    setting WINDOW=(N−1)*M+1.

4. The method as claimed in claim 1;
    wherein calculating the transmission window size (WINDOW) based on the receiver−s capacity and a plurality of configured system parameters further comprises the steps of:
    setting M=the maximum number of multiple transmissions eta data block;
    setting N=the number of active HARQ processes configured for the receiver;
    setting W=the maximum window size supported by the receiver; and
    setting WINDOW equal to ((N−1)*M+1) or W, whichever has the smaller value.

5. The method as claimed in claim 1;
    wherein updating the boundaries of the transmission window if the TSN of the acknowledged data block is equal to the current transmission window lower edge further comprises the steps a-b:
    a. finding x=the TSN of the next data block not yet acknowledged; and
    b. updating the TWLE=x and TWUE=(x+WINDOW−1).

6. The method as claimed in claim 1;
    wherein updating the boundaries of the transmission window if a data block is discarded from the retransmission buffer further comprises the steps c-d:
    c. finding x=the TSN of the next data block not yet acknowledged; and
    d. updating the TWLE=x and TWUE=(x+WINDOW−1).

7. A window based method to avoid the stall of data blocks during in-sequence delivery using reordering buffers at the receiver in a High Speed Downlink Packet Access (HSDPA) of a wireless communication system, wherein the transmitter assigns a Transmission Sequence Number (TSN) to each data block, and the receiver has the capacity of providing in-sequence delivery of received data blocks by temporarily storing the correctly received data blocks in the order of their TSN at reordering buffers before delivering them to upper layers, the method comprises the steps of:
at the receiver:
    setting WiNDOW_R=the receiving window size configured by the transmitter;
    setting N=the number of active HARQ processes configured for the receiver;
    initializing the receiving window with the receiving window lower edge (RWLE) set to a second constant, c2, and the receiving window upper edge (RWUE)=(c2+WINDOW_R−1);
    receiving a data block with its TSN=SN sent by the transmitter;
    discarding the data block if both the SN is outside the range of the current receiving window and ((SN−RWUE)>N); and
    updating the receiving window boundaries.

8. The method as claimed in claim 7;
    wherein the second constant, c2=0.

9. A window based method to avoid the stall of data blocks during in-sequence delivery using reordering buffers at the receiver in a High Speed Downlink Packet Access (HSDPA) of a wireless communication system, wherein the transmitter assigns a Transmission Sequence Number (TSN) to each data block, and the receiver has the capacity of providing in-sequence delivery of received data blocks by temporarily storing the correctly received data blocks in the order of their TSN at reordering buffers before delivering them to upper layers, the method comprising the steps of:
at the receiver;
setting WINDOW R=the receiving window size configured by the transmitter;
initializing a receiving window with a receiving window lower edge (RWLE) set to a predefined constant, c, and a receiving window upper edge (RWUE)=(c +WINDOW R−1);
receiving a data block with a TSN value sent by the transmitter;
when the TSN value of the received data block is within the range of the current receiving window then performing the following steps e-g:
e. storing the received data block in the reordering buffer according to the TSN value;
f. delivering data blocks with consecutive TSNs up to the first missing data block whose TSN is x to upper layer; and
g. updating the boundaries of the receiving window; and
when the TSN value of the received data block is outside the range of the current receiving window then performing the following steps h-1:
h. storing the received data block above the highest TSN of the reordering buffer based on the TSN value of the received data block;
i. updating the boundaries of the receiving window;
j. delivering all received data blocks outside the window range to upper layer;
k. delivering data blocks, within the receiving window range, with consecutive TSNs up to the first missing data block whose TSN=x to upper layer; and
l. further updating the boundaries of the receiving window.

10. The method as claimed in claim 9;
wherein updating the boundaries of the receiving window in step g further comprises the steps of:
setting the RWLE=x which is the TSN of the first missing data black; and setting the RWUE=x+WINDOW−1.

11. The method as claimed in claim 9;
wherein updating the boundaries of the receiving window in step i further comprises the steps of:
setting RWUE=SN; and setting RWLE=SN−WINDOW+1.

12. The method as chimed in claim 9;
wherein further updating the boundaries of the receiving window in step to 1 further comprises the steps of:
setting RWUE=x which is the TSN of the first missing data block; and
setting RWUE=x+WINDOW−1.

13. A transmitter having a window based means to avoid the stall of data blocks during in-sequence delivery using reordering buffers at the receiver in a High Speed Downlink Packet Access (HSDPA) of a wireless communication system, wherein the transmitter assigns a Transmission Sequence Number (TSN) to each data block, the transmitter comprising:
means for calculating the transmission window size (WINDOW) based on the receivers's capacity and a plurality of configured system parameters;
means for synchronizing the value of WINDOW with the receiver;
means for initializing the transmission window with the transmission window lower edge (TWLE) set to a first constant, c3, and the transmission window upper edge (TWUE)=(c3+WINDOW−1);

means for sending a data block only if its TSN is within the range of the transmission window;
means for receiving an acknowledgement for a sent data block from the receiver;
means for updating the boundaries of the transmission window if the TSN of the acknowledged data block is equal to the current transmission window lower edge; and
means for updating the boundaries of the transmission window if a data block is discarded from the retransmission buffer.

14. The transmitter as claimed in claim 13;
wherein the means for calculating the transmission window size (WINDOW) based on the receiver's capacity and a plurality of configured system parameters further comprises:
means for setting M=the maximum number of multiple transmissions of a data block;
means for setting N=the number of active HARQ processes configured for the receiver; and
means for setting WINDOW=(N−1)*M+1.

15. The transmitter as claimed in claim 13;
wherein the means for calculating the transmission window size (WINDOW) based an the receiver's capacity and a plurality of configured system parameters further comprises:
means for setting M=the maximum number of multiple transmissions of a data block;
means for setting N=the number of active HARQ processes configured for the receiver;
means far setting W=the maximum window size supported by the receiver; and
means for setting WINDOW equal to ((N−1)*M+1) or W, whichever has the smaller value.

16. The transmitter as claimed in claim 13;
wherein the means for updating the boundaries of the transmission window if the TSN of the acknowledged data block is equal to the current transmission window lower edge further comprises:
means for finding x=the TSN of the next data block not yet acknowledged; and
means for updating the TWLE=x and TWUE=(x+WINDOW−1).

17. The transmitter as claimed in claim 13;
wherein the means for updating the boundaries of the transmission window if a data blocks is discarded from the retransmission buffer further comprises:
means for finding x=the TSN of the next data block not yet acknowledged; and
means for updating the TWLE=x and TWUE=(x+WINDOW−1).

18. A receiver having a window based means to avoid the stall of data blocks during in-sequence delivery using reordering buffers at the receiver in a High Speed Downlink Packet Access (HSDPA) of a wireless communication system, wherein the transmitter assigns a Transmission Sequence Number (TSN) to each sending data block, and the receiver has the capacity of providing sequence delivery of received data blocks by temporarily storing the correctly received data blocks in the order of their TSN at reordering buffers before delivering them to upper layers, the receiver comprising:
means for setting WINDOW_R=the receiving window size configured by the transmitter;
means for setting N=the number of active HARQ processes configured for the receiver;

means for initializing a receiving window with the receiving window lower edge (TWLE) set to a second constant, c4 and the receiving window upper edge (RWUE)=(c4+WINDOW_R−1);

means for receiving a data. block with its TSN=SN seat by the transmitter;

means for discarding the data block if both the SN is outside the range of the current receiving window and ((SN−RWUE)>N); and means for updating the receiving window boundaries.

19. A receiver having a window based means to avoid the stall of data blocks during in-sequence delivery using reordering buffers at the receiver in a High Speed Downlink Packet Access (HSDPA) of a wireless communication system, wherein the transmitter assigns a Transmission Sequence Number (TSN) to each sending data block, and the receiver has the capacity of providing in-sequence delivery of received data blocks bs temporarily storing the correctly received data blocks in the order of their TSN at reordering buffers before delivering then to upper layers, the receiver comprising:

means for setting WINDOW R equal to the receiving window size conformed by the transmitter;

means for initializing a receiving window with the receiving window lower edge (RWLE) set to a predefined constant, c, and the receiving window upper edge (RWUE) equal to (c=WINDOW R−1);

means for receiving a data block with a TSN value sent by the transmitter;

means for checking if the TSN value of the received data block is within the range of the current receiving window then enabling processing using the following:

means for storing the received data block in the reordering buffer according to TSN value;

means for delivering data blocks with consecutive TSNs up to the first missing data block whose TSN is x to upper layer; and means for updating the boundaries of the receiving window; and means for checking if the TSN of the received data block is outside the range of the current receiving window then enabling processing using the following:

means for storing the received data block above the highest TSN of the reordering buffer based on the TSN value of the received data block;

means for updating the boundaries of the receiving window;

means for delivering all received data blocks outside the window range to upper layer;

means for delivering data blocks, within the receiving window range, with consecutive TSNs up to the first missing data block whose TSN=x to upper layer; and means for further updating the boundaries of the receiving window.

20. The receiver as claimed in claim 19;

wherein the means for further updating the boundaries of the receiving window further comprises:

means for setting the RWLE=x which is the TSN of the first missing data block; and means for setting the RWUE=x+WINDOW−1.

21. The receiver as claimed in claim 19;

wherein the means for updating the boundaries of the receiving window further comprises:

means for setting RWUE=SN; and means for setting RWLE=SN−WINDOW+1.

* * * * *